United States Patent [19]

Phaal et al.

[11] Patent Number: 4,534,773
[45] Date of Patent: Aug. 13, 1985

[54] ABRASIVE PRODUCT AND METHOD FOR MANUFACTURING

[76] Inventors: Cornelius Phaal, 34 Rutland Ave., Craighall Park, Johannesburg, Transvaal; Noel J. Pipkin, 115 Pritchard St., Johannesburg North, Randburg, Transvaal; Richard P. Burnand, 39 Constantia Ave., Alan Manor, Johannesburg, Transvaal, all of South Africa

[21] Appl. No.: 566,862

[22] Filed: Dec. 29, 1983

[30] Foreign Application Priority Data

Jan. 10, 1983 [ZA] South Africa .................. 83/0139
Feb. 4, 1983 [ZA] South Africa .................. 83/0754

[51] Int. Cl.³ .............................................. B24D 3/00
[52] U.S. Cl. .................................... 51/293; 51/308; 51/309
[58] Field of Search ..................... 51/293, 308, 309

[56] References Cited

U.S. PATENT DOCUMENTS 4,124,401 11/1978 Lee et al. ............................. 51/307
4,151,686 5/1979 Lee et al. ............................. 51/307
4,224,380 9/1980 Bovenkerk et al. ................. 51/309

Primary Examiner—Paul Lieberman
Assistant Examiner—Willie J. Thompson
Attorney, Agent, or Firm—Curtis, Morris & Safford

[57] ABSTRACT

An abrasive body is provided which has high strength and an ability to withstand high temperatures making it suitable as a tool insert for dressing tools and surface set drill bits. The body comprises a mass of diamond particles present in an amount of 80 to 90 percent by volume of the body and a second phase present in an amount of 10 to 20 percent by volume of the body, the mass of diamond particles containing substantial diamond-to-diamond bonding to form a coherent skeletal mass and the second phase containing nickel and silicon, the nickel being in the form of nickel and/or nickel silicide and the silicon being in the form of silicon, silicon carbide and/or nickel silicide. The abrasive bodies are made under conditions of elevated temperature and pressure suitable for diamond compact manufacture.

9 Claims, 5 Drawing Figures

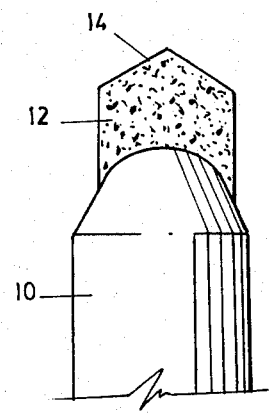
FIG_1
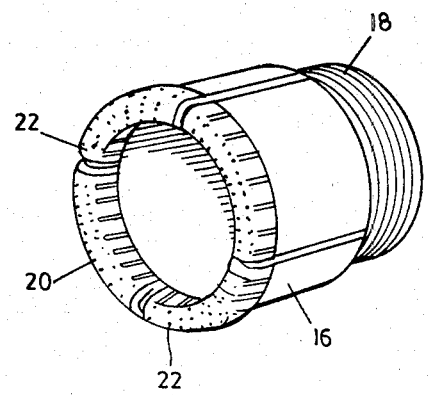
FIG_2
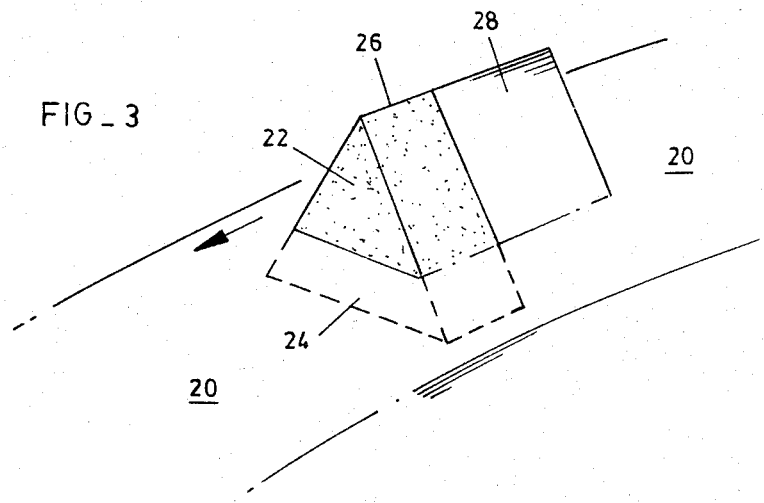
FIG_3

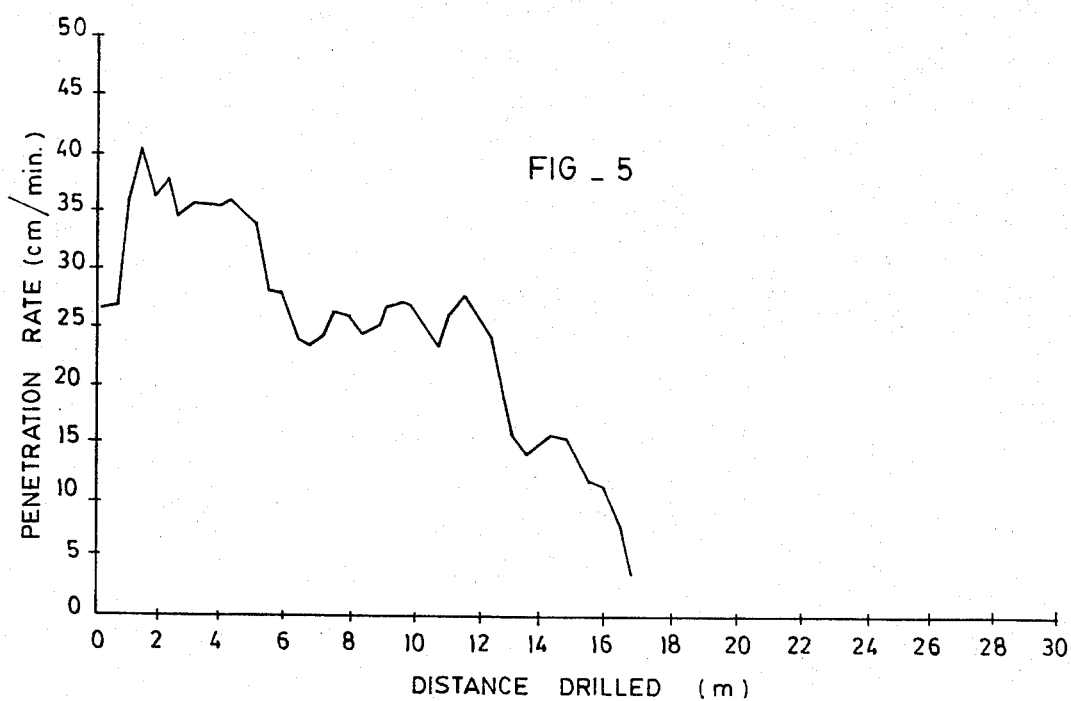
FIG_5
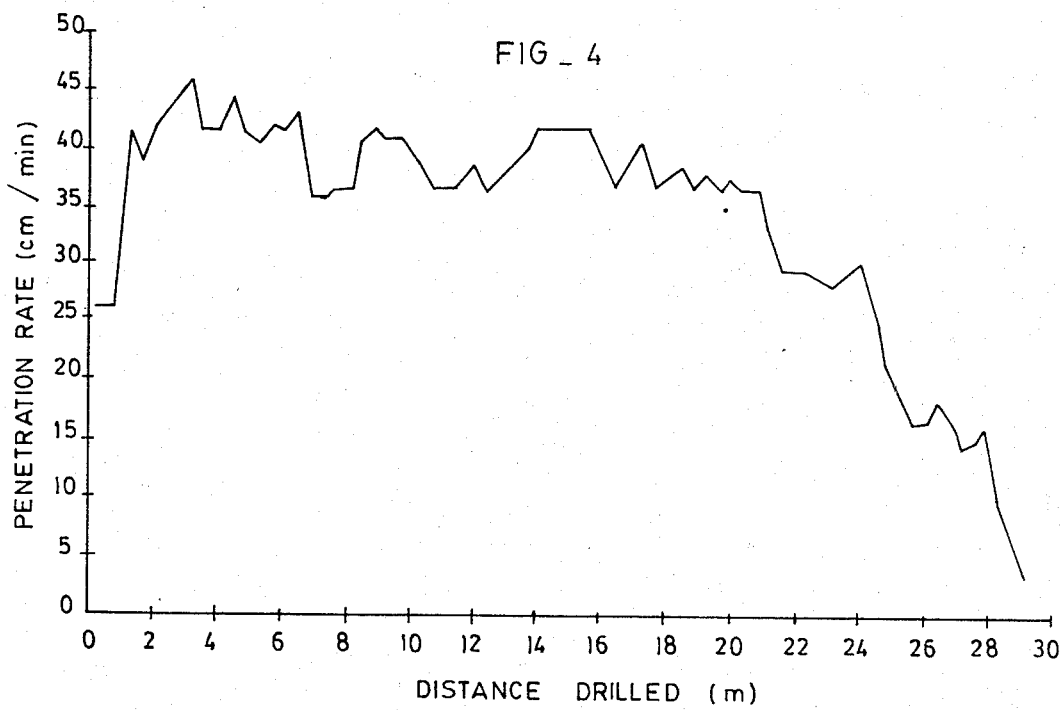
FIG_4

ABRASIVE PRODUCT AND METHOD FOR MANUFACTURING

BACKGROUND OF THE INVENTION

This invention relates to abrasive products.

Abrasive compacts are well known in the art and are used extensively in industry for the abrading of various workpieces. They consist essentially of a mass of abrasive particles present in an amount of at least 70 percent, preferably 80 to 90 percent, by volume of the compact bonded into a hard conglomerate. Compacts are polycrystalline masses and can replace single large crystals. The abrasive particles of compacts are invariably ultra-hard abrasives such as diamond and cubic boron nitride.

Abrasive compacts generally contain a second phase or bonding matrix which contains a catalyst (also known as a solvent) useful in synthesising the particles. In the case of cubic boron nitride, examples of suitable catalysts are aluminium or an alloy of aluminium with nickel, cobalt, iron, manganese or chromium. In the case of diamond, examples of suitable catalysts are metals of Group VIII of the Periodic Table such as cobalt, nickel or iron or an alloy containing such a metal.

As is known in the art, diamond and cubic boron nitride compacts are manufactured under conditions of temperature and pressure at which the abrasive particle is crystallographically stable.

Abrasive compacts may be bonded directly to a tool or shank for use. Alternatively, they may be bonded to a backing such as a cemented carbide backing prior to being mounted on a tool or shank.

U.S. Pat. No. 4,224,380 describes a method of leaching out a substantial quantity of the catalyst from a diamond compact. The product so produced comprises self-bonded diamond particles comprising between about 70 percent and 95 percent by volume of the product, a metallic phase infiltrated substantially uniformly throughout the product, the phase comprising between about 0,05 percent and 3 percent by volume of the product, and a network of interconnected, empty pores dispersed throughout the product and defined by the particles and the metallic phase, the pores comprising between 5 percent and 30 percent by volume of the product. Leaching may be achieved by placing a diamond compact in a hot concentrated nitric-hydrofluoric acid solution for a period of time. This treatment with the hot acid leaches out the catalyst phase leaving behind a skeletal diamond structure. The leached product is said to be thermally more stable than the unleached product.

U.S. Pat. No. 4,124,401 describes and claims a polycrystalline diamond body comprised of a mass of diamond crystals adherently bonded together by a silicon atom-containing bonding medium comprised of silicon carbide and a carbide and/or silicide of a metal component which forms a silicide with silicon, the diamond crystals ranging in size from 1 micron to about 1 000 microns, the density of the crystals ranging from at least about 70 percent by volume up to about at least about 90 percent by volume of said body, said silicon atom-containing bonding medium being present in an amount ranging up to about 30 percent by volume of said body, said bonding medium being distributed at least substantially uniformly throughout the body, the portion of the bonding medium in contact with the surfaces of the diamond crystals being at least in a major amount silicon carbide and the diamond body being at least substantially pore-free. The metal component for the diamond body is selected from a wide group of metals consisting of cobalt, chromium, iron, hafnium, manganese, molybdenum, niobium, nickel, palladium, platinum, rhenium, rhodium, ruthenium, tantalum, thorium, titanium, uranium, vanadium, tungsten, yttrium, zirconium and alloys thereof. The polycrystalline diamond body is made under relatively mild hot pressing conditions and such that diamond intergrowth will not occur.

U.S. Pat. No. 4,151,686 describes a polycrystalline diamond body similar to that of U.S. Pat. No. 4,124,401 save that the bonding medium is comprised of silicon carbide and elemental silicon and the density of diamond crystals in the body ranges from 80 percent by volume to about 95 percent by volume of the body.

U.S. Pat. No. 3,234,321 describes diamond compacts having a second phase of titanium, vanadium, zirconium, chromium or silicon or an alloy thereof or an alloy of any of these metals with nickel, manganese or iron.

SUMMARY OF THE INVENTION

An abrasive body according to the invention comprises a mass of diamond particles present in an amount of 80 to 90 percent by volume of the body and a second phase present in an amount of 10 to 20 percent by volume of the body, the mass of diamond particles containing substantial diamond-to-diamond bonding to form a coherent skeletal mass and the second phase containing nickel and silicon, the nickel being in the form of nickel and/or nickel silicide and the silicon being in the form of silicon, silicon carbide and/or nickel silicide.

Further according to the invention there is provided a dressing tool comprising a tool shank and an abrasive body as defined above mounted in one end thereof to present a dressing edge.

Still further according to the invention there is provided a surface set drill bit comprising a rotatable body presenting at one end thereof a cutting face, the cutting face having a plurality of abrasive bodies as defined above mounted therein to present cutting edges for the face.

Still further according to the invention there is provided a method of producing an abrasive body as defined above including the steps of:

(a) placing a mass of diamond particles in a reaction vessel;

(b) placing a mass of nickel and silicon on the mass of diamond particles;

(c) placing the loaded reaction vessel in the reaction zone of a high temperature/high pressure apparatus;

(d) subjecting the contents of the reaction vessel to conditions of elevated temperature and pressure in the diamond stable region of the carbon phase diagram for a time sufficient to produce the abrasive body; and (e) recovering the abrasive body from the reaction zone.

DESCRIPTION OF THE DRAWINGS

FIG. 1 is a fragmentary side view of a dressing tool of the invention;

FIG. 2 is a perspective view of a surface set drill bit of the invention;

FIG. 3 is a perspective view of a portion of the cutting face of the bit of FIG. 2;

FIGS. 4 and 5 illustrate graphically the results of certain drilling tests carried out using abrasive bodies of the invention.

DETAILED DESCRIPTION OF THE INVENTION

It has been found that the abrasive products of the invention have substantial strength due, at least in part, to the substantial diamond-to-diamond bonding which forms a coherent skeletal mass. The diamond-to-diamond bonding includes both diamond intergrowth and physical diamond-to-diamond interlocking and bonding created by plastic deformation of the diamond particles during manufacture of the body. Furthermore, the abrasive bodies have been found to be capable of withstanding a temperature of 1200° C. under a vacuum of $10^{-4}$ Torr or better without significant graphitisation of the diamond occurring. The strength of the abrasive bodies and their ability to withstand high temperatures makes them ideal as tool inserts for tools where high temperatures are generated during use thereof, as for example in dressing tools, or where high temperatures are required during manufacture of the tool, as for example in surface set drill bits.

The second phase will be uniformly distributed through the coherent, skeletal diamond mass. In order to achieve suitable diamond-to-diamond bonding it has been found necessary for the second phase to be present in an amount of 10 to 20 percent by volume of the body. When higher or lower amounts of a second phase are used abrasive bodies of suitable strength are not produced. The preferred amount of second phase is 15 to 20 percent by volume of the body. The weight ratio of the silicon to the nickel will typically be in the range 90:10 to 50:50.

The abrasive bodies of the invention may take on a variety of shapes depending on the use to which they are put. Examples of suitable shapes are disc, triangular, cube and rectangular.

The abrasive bodies of the invention are manufactured, in the manner described above, using temperatures and pressures in the diamond stable region of the carbon phase diagram. The preferred conditions of temperature and pressure are temperatures in the range 1400° to 1600° C. and pressures in the range 50 to 70 kilobars. These elevated conditions of temperature and pressure will be maintained for a time sufficient to produce the abrasive body. Typically, these elevated conditions of temperature and pressure are maintained for a period of 5 to 20 minutes. The nickel and silicon may be provided in the form of a mixture or alloy or in the form of discrete layers. It is preferred that a nickel layer is placed in contact with the diamond mass and a layer of silicon placed on the nickel layer. The nickel and silicon may be provided in the form of powders or in the form of sheets or foils.

The diamond particles used in the manufacture of the abrasive body of the invention may vary from coarse to fine particles. Generally the particles will be less than 100 microns in size and typically have a size in the range 60 to 75 microns.

High temperature/high pressure apparatus is well known in the art—see, for example, U.S. Pat. No. 2,941,248.

FIG. 1 illustrates the use of an abrasive body of the invention in a dressing tool. Referring to this Figure, there is shown a dressing tool comprising a shank 10 having an abrasive body 12 mounted in one end thereof. The abrasive body presents a dressing edge 14. High temperatures are generated at the dressing edge 14 during use of the tool. However, it has been found that the excellent thermal stability of the abrasive body 12 enables the body to withstand these high temperatures.

FIGS. 2 and 3 illustrate a surface set drill bit (also referred to as a coring bit) using abrasive bodies of the invention. Referring to these Figures, there is shown a surface set drill bit comprising a rotatable core 16 having one end 18 threaded for engagement in a coring drill and a cutting face 20 at the other end thereof. The cutting face 20 comprises a plurality of cutting elements 22 firmly held in a suitable metal matrix. The cutting elements 22 each comprise triangular shaped abrasive bodies of the invention, as illustrated in greater detail in FIG. 3. The triangular abrasive bodies 22 are so mounted in the cutting face 20 that the base of the triangle is located in a recess 24 and the top pointed edge 26 stands proud of the general plane of the cutting face to present a cutting edge. Located immediately behind the triangular abrasive body 22 is a support 30 made of the same metal as the cutting face. The direction of rotation of the bit is shown by the arrow.

In surface set drill bits, the cutting elements are set into the cutting face using standard high temperature infiltration techniques. The excellent thermal stability of the abrasive bodies of the invention enables them to withstand such temperatures without significant degradation thereof.

The invention is further illustrated by the following examples.

EXAMPLE 1

A mass of diamond particles (12,5 g) was placed in a zirconium cup. A sheet of nickel (0,33 g) was placed on top of the mass of diamonds and a layer of silicon powder (1,53 g) placed on the nickel sheet. Thus, the weight ratio of silicon/nickel was 82:18. The silicon/nickel constituted 13 percent by weight of the contents of the loaded zirconium cup.

The loaded cup was placed in the reaction zone of a conventional high temperature/high pressure apparatus and subjected to 1500° C. temperature and 55 kilobars pressure and these conditions were maintained for a period of 10 minutes. Recovered from the reaction zone was a disc-shaped abrasive body which comprised a mass of diamond particles in which there was a substantial amount of diamond-to-diamond bonding forming a coherent skeletal diamond mass and a second phase containing silicon carbide, nickel and a small amount of nickel silicide, uniformly distributed through the diamond mass.

EXAMPLE 2

The method as described in Example 1 was repeated, save that the amount of silicon/nickel in the loaded cup constituted 12 percent by weight of the contents thereof. An abrasive body similar to that of Example 1 was produced.

The abrasive bodies produced in the above two examples were cut into triangular-shaped fragments using conventional laser cutting techniques. The fragments so produced were incorporated in the cutting faces of conventional surface set drill (coring) bits. Each bit contained 30 radially spaced triangles set in the cutting face and a further 12 triangles on the inside and outside gauge of the bit. The 30 radially spaced triangles were positioned in the cutting face in the manner illustrated by FIG. 3. Two such bits were produced. The first containing triangles produced from the abrasive body of Example 1 and the second containing triangles produced from the abrasive body of Example 2.

The bits were subjected to drill tests. The tests involved applying a constant load to the bit and monitoring the penetration rate as a function of depth drilled. The applied load was 1000 kg. The workpiece was Norite Granite, which is recognised as a medium to hard rock with an unconfined compressive strength of approximately 255 MPa. Holes of approximately 450 mm each were drilled into the test blocks. The drill speed was held constant throughout the tests at 800 rpm. The flushing medium and coolant was water at a flow rate across the cutting face of approximately 30 liters per minute.

The results of the tests are illustrated graphically by FIGS. 4 and 5. The results illustrated by FIG. 4 were produced using a drill bit having triangles produced from a body of Example 1 while the results illustrated by FIG. 5 were produced using a drill bit having triangles produced from a body of Example 2. It will be seen from these results that in the case of the drill bit using Example 1 triangles, the penetration rate dropped to an unacceptable level only after 28 meters had been drilled. This is extremely good. In the case of the drill bit using Example 2 triangles, the penetration rate dropped to an unacceptable level after 16 meters had been drilled. While this is poorer than that achieved using Example 1 triangles, it is nevertheless extremely satisfactory.

We claim:

1. An abrasive body comprising a mass of diamond particles present in an amount of 80 to 90 percent by volume of the body and a second phase present in an amount of 10 to 20 percent by volume of the body, the mass of diamond particles containing substantial diamond-to-diamond bonding to form a coherent skeletal mass and the second phase containing nickel and silicon. the nickel being in the form of nickel and/or nickel silicide and the silicon being in the form of silicon, silicon carbide, and/or nickel silicide.

2. An abrasive body according to claim 1 wherein the second phase constitutes 15 to 20 percent by volume of the body.

3. An abrasive body according to claim 1 wherein the ratio of silicon to nickel in the second phase is in the range 90:10 to 50:50 on a weight basis.

4. An abrasive body according to claim 1 having a disc, triangular, cube or rectangular shape.

5. A dressing tool comprising a tool shank and an abrasive body according to claim 1 mounted in one end thereof to present a dressing edge.

6. A surface set drill bit comprising a rotatable body presenting at one end thereof a cutting face, the cutting face having a plurality of abrasive bodies according to claim 1 mounted therein to present cutting edges for the face.

7. A method of producing an abrasive body according to claim 1 including the steps of:
    (a) placing a mass of diamond particles in a reaction vessel;
    (b) placing a mass of nickel and silicon on the mass of diamond particles;
    (c) placing the loaded reaction vessel in the reaction zone of a high temperature/high pressure apparatus;
    (d) subjecting the contents of the reaction vessel to conditions of elevated temperature and pressure in the diamond stable region of the carbon phase diagram for a time sufficient to produce the abrasive body; and
    (e) recovering the abrasive body from the reaction zone.

8. A method of claim 7 wherein discrete layers of nickel and silicon are placed on the mass of diamond particles.

9. A method according to claim 8 wherein the layer of nickel is placed in contact with the diamond particles and the layer of silicon placed on the nickel layer.

* * * * *